(12) United States Patent
Salter et al.

(10) Patent No.: US 12,533,975 B2
(45) Date of Patent: Jan. 27, 2026

(54) SYSTEMS AND METHODS FOR CONTROLLING CHARGING OPERATION OF A VEHICLE BATTERY

(71) Applicant: Ford Global Technologies, LLC, Dearborn, MI (US)

(72) Inventors: Stuart C. Salter, White Lake, MI (US); Jeff Robert Seaman, Petersburg, MI (US); Tim Michael Farmer, Clinton Township, MI (US); Todd Ansbacher, Westland, MI (US); David Celinske, Wolverine Lake, MI (US); Brendan Diamond, Grosse Pointe, MI (US)

( * ) Notice: Subject to any disclaimer, the term of this patent is extended or adjusted under 35 U.S.C. 154(b) by 57 days.

(21) Appl. No.: 18/421,302

(22) Filed: Jan. 24, 2024

(65) Prior Publication Data
US 2025/0236190 A1    Jul. 24, 2025

(51) Int. Cl.
*B60Q 1/00* (2006.01)
*B60L 53/22* (2019.01)
*B60L 58/13* (2019.01)
*B60L 58/16* (2019.01)
*B60L 58/20* (2019.01)

(52) U.S. Cl.
CPC .............. *B60L 53/22* (2019.02); *B60L 58/13* (2019.02); *B60L 58/16* (2019.02); *B60L 58/20* (2019.02); *B60L 2210/10* (2013.01); *B60L 2240/62* (2013.01); *B60L 2240/662* (2013.01); *B60L 2250/10* (2013.01); *B60L 2250/12* (2013.01); *B60L 2260/50* (2013.01)

(58) Field of Classification Search
CPC .......... B60L 53/22; B60L 58/13; B60L 58/16; B60L 58/20; B60L 2210/10; B60L 2240/62; B60L 2240/662; B60L 2250/10; B60L 2250/12; B60L 2260/50
USPC ........................................................ 340/455
See application file for complete search history.

(56) References Cited

U.S. PATENT DOCUMENTS

| | | |
|---|---|---|
| 9,114,709 B2 | 8/2015 | Stanek et al. |
| 9,969,292 B2 | 5/2018 | Thieme et al. |
| 10,611,258 B2 | 4/2020 | Symanow et al. |

(Continued)

OTHER PUBLICATIONS

V V Debelov, et. al., Charging Balance Management Technology for Low-Voltage Battery in the Car Control Unit With Combined Power System, https://iopscience.iop.org/article/10.1088/1757-899X/534/1/012029, pp. 1-16, Mar. 14, 2019.

*Primary Examiner* — Tai T Nguyen
(74) *Attorney, Agent, or Firm* — Frank Lollo; Eversheds Sutherland (US) LLP (57) ABSTRACT

A vehicle including a Direct Current-to-Direct Current (DC to DC) converter, a low-voltage battery, a memory and a processor is disclosed. The DC to DC converter may be configured to convert a high voltage electric power to a low voltage electric power, and the low-voltage battery may be configured to be charged by the DC to DC converter via the low voltage electric power. The memory may be configured to store inputs associated with a vehicle user. The processor may be configured to determine that a trigger event has occurred, and estimate a future vehicle usage based on the inputs responsive to determining that the trigger event has occurred. The processor may further control a charging operation of the low-voltage battery by the DC to DC converter based on the future vehicle usage.

20 Claims, 4 Drawing Sheets

(56) References Cited

U.S. PATENT DOCUMENTS

| | | |
|---|---|---|
| 10,876,510 B2 | 12/2020 | Ciaccio et al. |
| 2018/0026546 A1* | 1/2018 | Iisaka ............... H02M 7/12 |
| | | 320/140 |
| 2021/0099007 A1* | 4/2021 | Chen ............... H02J 7/1446 |
| 2022/0173658 A1* | 6/2022 | Takagi ............ H02M 3/158 |
| 2023/0106645 A1* | 4/2023 | Tachibana .......... B60L 58/12 |
| | | 320/109 |
| 2023/0121220 A1 | 4/2023 | Gannamaneni et al. |
| 2023/0294531 A1* | 9/2023 | Kuribara .......... H02J 7/0032 |
| | | 320/109 |

* cited by examiner

SYSTEMS AND METHODS FOR CONTROLLING CHARGING OPERATION OF A VEHICLE BATTERY

FIELD

The present disclosure relates to systems and methods for controlling charging operation of a vehicle low-voltage battery during key-off.

BACKGROUND

It is known that vehicles include a plurality of Direct Current to Direct Current (DC to DC) converters that enable operation of vehicle components that require electric power at different voltages. As an example, many modern vehicles include a high power-rated DC to DC converter that powers most of the vehicle's components/features, e.g., traction, control systems, sensors, lighting, etc. during vehicle key-on and a low power-rated DC to DC converter that powers/energizes a vehicle low-voltage battery during vehicle key-off. Energizing the low-voltage battery during key-off is required to ensure that essential vehicle key-off loads continue to operate efficiently. Furthermore, energizing the low-voltage battery during key-off ensures that the low-voltage battery stays alive or does not completely drain out.

There are known instances of the low power-rated DC to DC converter becoming faulty, resulting in no or lack of charging for the low-voltage battery. Such instances may cause inconvenience to a vehicle user.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle including a first Direct Current to Direct Current (DC to DC) converter or a "main" DC to DC converter, a second DC to DC converter, a high-voltage (HV) battery and a low-voltage (LV) battery. The first DC to DC converter may have a greater power/ampere rating than the second DC to DC converter. The first DC to DC converter may be configured to convert an HV electric power obtained from the HV battery to an LV electric power. The first DC to DC converter may be configured to energize, via the power obtained from the HV battery, most of the vehicle components/features during vehicle key-on or when the vehicle engine may be switched ON. The LV battery may be configured to power key-off loads during vehicle key-off. In some aspects, the second DC to DC converter may be configured to charge the LV battery during vehicle key-off, when the second DC to DC converter may operating optimally (or not be faulty). The vehicle, as disclosed in the present disclosure, may be configured to enable efficient LV battery charging during vehicle key-off by using the first DC to DC converter, when the second DC to DC converter may develop a fault.

In some aspects, responsive to determining that the second DC to DC converter may be faulty during vehicle key-off, the vehicle may first shut down non-essential (or non-critical) key-off loads. The vehicle may additionally inform a vehicle user about the faulty second DC to DC converter by transmitting an alert notification to a user device associated with the vehicle user. The vehicle may further determine when the vehicle user may be expected to return to the vehicle, based on a connected calendar associated with the vehicle user and/or inputs obtained directly from the vehicle user.

Responsive to determining that the vehicle user may return to the vehicle within a predefined time duration (e.g., within 1 or 2 days), the vehicle may cause the first DC to DC converter to charge the LV battery continuously (or at a high frequency) when the LV battery health may be poor. On the other hand, the vehicle may cause the first DC to DC converter to charge the LV battery cyclically when the LV battery health may be good, but the first DC to DC converter health may be poor or a first DC to DC converter run time may be high. During cyclic charging operation of the LV battery, the first DC to DC converter may charge the LV battery when an LV battery state of charge (SOC) level may drop below a standard battery SOC level by a predefined discharge level. In some aspects, the vehicle may determine the predefined discharge level based on the LV battery health, the first DC to DC converter health, ambient temperature, expected vehicle user return time, and/or the like.

In further aspects, responsive to determining that the vehicle user may return to the vehicle within the predefined time duration, the vehicle may determine an ambient temperature. The vehicle may cause the first DC to DC converter to charge the LV battery continuously when the ambient temperature may be cold. In some aspects, vehicle coolant pumps/fans may not be required to be operated when the first DC to DC converter may be charging the LV battery during vehicle key-off in cold ambient temperature.

Furthermore, responsive to determining that the vehicle user may not return to the vehicle within the predefined time duration, the vehicle may transmit a message to the user device providing an option to the vehicle user to accept a dead-battery mode of the LV battery. Responsive to the user accepting the option, the vehicle may cause the first DC to DC converter to charge the LV battery to its maximum SOC level and then shut down the vehicle. The vehicle may further disable the first DC to DC converter from further charging the LV battery.

In additional aspects, when the vehicle may be located in proximity to a charging point or a charger (e.g., at user's home), the vehicle may request the vehicle user, via the user device, to charge the LV battery using the charging point. In this case, the vehicle may not charge the LV battery using the first DC to DC converter.

In further aspects, the vehicle may transmit a notification to a vehicle maintenance firm informing the firm about the faulty second DC to DC converter. The vehicle maintenance firm may arrange for repair or replacement of the second DC to DC converter, responsive to receiving the notification from the vehicle.

The present disclosure discloses a vehicle that enables efficient LV battery charging when the second DC to DC converter develops a fault. The vehicle enables the LV battery charging by optimizing LV battery cycling and first DC to DC converter run time, thereby ensuring that wear and tear of the LV battery and the first DC to DC converter may be minimized. The vehicle further informs the vehicle user about the faulty second DC to DC converter, which may enable the vehicle user to timely arrange for repair or replacement.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 1:
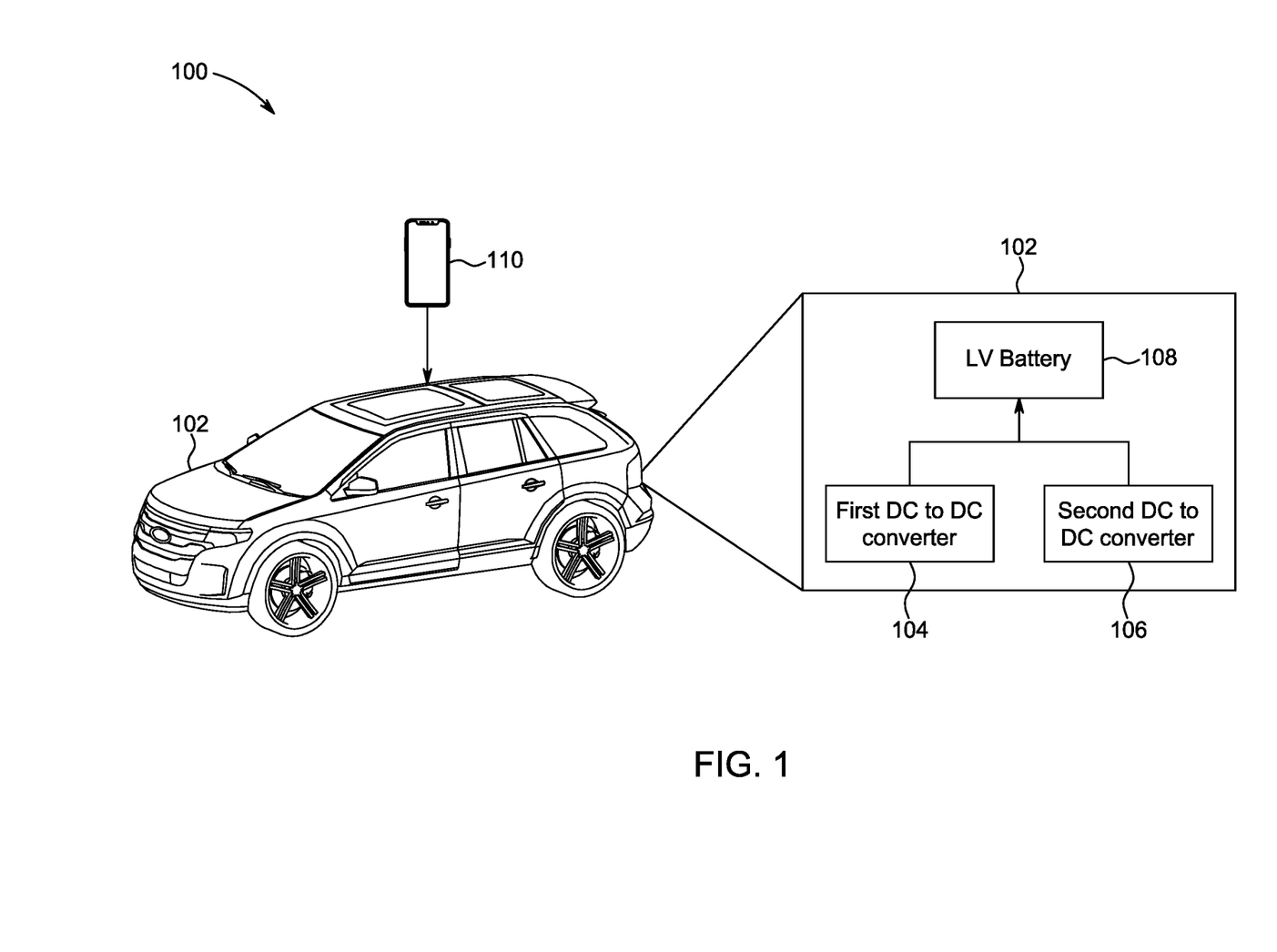
FIG. 1 depicts an environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102. The vehicle 102 may take the form of any passenger or commercial vehicle such as, for example, a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode. In an exemplary aspect, the vehicle 102 may be an Electric Vehicle (EV).

The vehicle 102 may include a first Direct Current to Direct Current (DC to DC) converter 104 and a second DC to DC converter 106. The first DC to DC converter 104 may be the "main" DC to DC converter of the vehicle 102 and may be electrically coupled with a vehicle high-voltage (HV) battery (shown as HV battery 240 in FIG. 2). The first DC to DC converter 104 may be configured to obtain HV electric power from the HV battery and convert it into low-voltage (LV) electric power to operate most of the vehicle components/features during vehicle key-on or when the vehicle's ignition may be switched ON. As an example, the first DC to DC converter 104 may power vehicle's traction, sensors, lighting systems, entertainment systems, power windows, power steering, heated sitting areas, and/or the like. In an exemplary aspect, the first DC to DC converter 104 may have a high power or ampere rating (or a "first ampere rating"), which may be in a range of 280 to 360 Amperes.

The second DC to DC converter 106 may be a secondary or "protected" DC to DC converter of the vehicle 102 and may operate during vehicle key-off or when the first DC to DC converter 104 may develop a fault/be non-operational (to enable operation of essential vehicle components/features such as power steering, vehicle speed reduction boosters, etc.). The second DC to DC converter 106 may be configured to obtain electric power from a vehicle energy storage (e.g., the HV battery) and convert it into an LV electric power. The second DC to DC converter 104 may have a low power or ampere rating (or a "second ampere rating"), which may be less than 20 or 30 Amperes. The LV electric power provided by the second DC to DC converter 106 may be used to power/energize/charge a vehicle LV battery 108 during vehicle key-off, which may be configured to power vehicle key-off loads. In an exemplary aspect, the LV battery 108 may be a 12 Volt battery (or a similar range low voltage battery).

Since the second ampere rating is considerably less than the first ampere rating, using the second DC to DC converter 106 to charge the LV battery 108 is preferred during vehicle key-off, as compared to using the first DC to DC converter 104. This is because the first DC to DC converter 104 may require considerable cooling during operation (due to its high power/ampere rating), which may not be optimal/efficient to provide during vehicle key-off. Specifically, to operate the first DC to DC converter 104 optimally to charge the LV battery 108, vehicle cooling pumps/fans (not shown) may be required to operate to cool the first DC to DC converter 104. Operating such vehicle cooling pumps/fans during vehicle key-off may considerably drain HV battery energy, and hence it is preferred that the second DC to DC converter 106 charges the LV battery 108 during vehicle key-off and not the first DC to DC converter 104, especially when both the first and second DC to DC converters 104, 106 may be operational.

In some aspects, the first DC to DC converter 104 may be used to charge the LV battery 108 during vehicle key-off when the second DC to DC converter 106 may be faulty, as described below.

The vehicle 102 may be configured to optimize the charging operation of the LV battery 108 when the second DC to DC converter 106 develops a fault or becomes non-operational during vehicle key-off. Stated another way, the vehicle 102 may be configured to optimize the LV battery charging operation when the second DC to DC converter 106 may not be available to charge the LV battery 108 during vehicle key-off. In some aspects, the vehicle 102 may implement one or more different methods/approaches to charge the LV battery 108 during vehicle key-off when the second DC to DC converter 106 may be non-operational, as briefly described below and described in detail in conjunction with FIG. 2.

Responsive to determining that the second DC to DC converter 106 may be non-operational during vehicle key-off, the vehicle 102 may first shut down all non-essential (or non-critical) key-off loads to conserve energy in the LV battery 108. For example, the vehicle 102 may enter a battery-saving mode or critical-energy mode and shut down front zonal features/components (i.e., the vehicle user may not be able to access the frunk from outside the vehicle 102), rear zonal features/components (i.e., a vehicle tailgate may not operate from outside the vehicle 102), and/or the like.

The vehicle 102 may further transmit an alert notification to a user device 110 associated with the vehicle user, informing the vehicle user about the faulty condition of the second DC to DC converter 106. The vehicle 102 may further output another alert notification (e.g., a battery error notification) on a vehicle Human-Machine Interface (HMI) (shown as HMI 238 in FIG. 2), responsive to determining that the second DC to DC converter 106 may be non-operational.

The vehicle 102 may further obtain one or more inputs/parameters associated with the vehicle user, the LV battery health status, the first DC to DC converter health status and/or run time, ambient temperature, vehicle geolocation, HV battery state of charge (SOC), and/or the like, to optimally charge the LV battery 108 using the first DC to DC converter 104 or request the vehicle user to charge the LV battery 108 by using a charging point located in proximity to the vehicle 102. In some aspects, the inputs associated with the vehicle user may include an expected time when the vehicle user may return to the vehicle 102 or an expected time when the vehicle engine may be switched ON by the vehicle user.

In some aspects, when the vehicle 102 determines that the vehicle user may return to the vehicle 102 within a predefined time duration (e.g., within one or two days), the vehicle 102 may cause the first DC to DC converter 104 to charge the LV battery 108 continuously or at a high frequency when the LV battery health may be poor (or below a battery health threshold). A person ordinarily skilled in the art may appreciate that when the first DC to DC converter 104 charges the LV battery 108 continuously or at a high frequency, a "depth of discharge" of the LV battery 108 may be low, and hence wear and tear during the battery charging operation may also be low.

On the other hand, when the vehicle 102 determines that the vehicle user may return to the vehicle 102 within the predefined time duration and the LV battery health may be good (or above the battery health threshold), the vehicle 102 may check the first DC to DC converter health status and/or run time and/or the HV battery SOC. The vehicle 102 may cause the first DC to DC converter 104 to charge the LV battery 108 cyclically (as opposed to continuously), when the first DC to DC converter health may be poor (or below a predefined converter health threshold), the first DC to DC converter may be greater than a run time threshold (or remaining converter run time may be less) and/or the HV battery SOC may be less than an HV SOC threshold. Specifically, in this case, the vehicle 102 may cause the first DC to DC converter 104 to charge the LV battery 108 when a low-voltage battery SOC level drops by a predefined discharge SOC level below a standard SOC level. For example, if the standard SOC level is 90% and the predefined discharge SOC level is 70%, the vehicle 102 may cause the first DC to DC converter 104 to charge the LV battery 108 when the low-voltage battery SOC level drops to below 20%. In this case, the first DC to DC converter 104 may charge the LV battery 108 to 90% SOC level (or until the standard SOC level) and then stop charging. The LV battery 108 may then gradually expend the stored energy by powering key-off loads, and the first DC to DC converter 104 may again charge the LV battery 108 when the SOC level drops to below 20%. In this manner, the first DC to DC converter 104 charges the LV battery 108 cyclically in this method, as opposed to continuously.

In some aspects, the vehicle 102 may determine the predefined discharge SOC level based on the first DC to DC converter health and the LV battery health, such that the vehicle 102 may optimize or balance the LV battery charging and discharging (or LV battery "cycling") and the first DC to DC converter run time.

In further aspects, when the vehicle 102 determines that the vehicle user may return to the vehicle 102 within the predefined time duration and the ambient temperature may be less than a predefined temperature threshold (i.e., the ambient weather may be cold), the vehicle 102 may cause the first DC to DC converter 104 to charge the LV battery 108 continuously. A person ordinarily skilled in the art may appreciate that when the ambient weather may be cold, the coolant pumps/fans may not be required to operate and cool the first DC to DC converter 104 when the first DC to DC converter 104 charges the LV battery 108 during vehicle key off, and thus the first DC to DC converter 104 may efficiently charge the LV battery 108 without draining the HV battery substantially (due to non-operation of the coolant pumps).

When the vehicle 102 determines that the vehicle user may not return to the vehicle 102 within the predefined time duration, the vehicle 102 may transmit a predefined message to the user device 110, informing the vehicle user an estimated count of days the vehicle 102/LV battery 108 may stay alive or energized, an estimated LV battery life already lost, and an option to cause the LV battery 108 to enter a dead-battery mode. The message may indicate to the vehicle user that since the vehicle user may not return to the vehicle 102 within the predefined time duration (e.g., may not return for multiple weeks), it may be advisable to cause the LV battery 108 to enter a dead-battery mode and perform dead battery restart when the vehicle user returns to the vehicle 102, as opposed to charging/discharging the LV battery 108 and operating the first DC to DC converter 104 for multiple weeks (which may put stress on the LV battery 108 and/or the first DC to DC converter 104).

Responsive to obtaining the predefined message, the vehicle user may transmit a confirmation to the vehicle 102 via the user device 110. The confirmation may indicate a user consent to cause the LV battery 108 to enter the dead-battery mode. The vehicle 102 may obtain the confirmation from the user device 110 and may then cause the first DC to DC converter 104 to charge the LV battery 108 to its maximum SOC level before shutting down the vehicle 102 or shutting down power consumption in the vehicle 102. The vehicle 102 may also disable the first DC to DC converter 104 from further charging the LV battery 108. A person ordinarily skilled in the art may appreciate that this method minimizes wear and tear on the LV battery 108 and the first DC to DC converter 104 when the vehicle user may be away from the vehicle 102 for multiple weeks and may potentially prevent any further vehicle component fault while also maintaining the HV battery SOC level in the user's extended absence.

In additional aspects, the vehicle 102 may transmit a request to the user device 110 requesting the vehicle user to charge the LV battery 108 using a charging point that may be located in proximity to the vehicle 102, when the vehicle 102 may be located at user's home or any other location where a charging point may be accessible (as determined via the vehicle geolocation). In this case, the vehicle 102 may request the vehicle user to charge the LV battery 108 using the charging point, as opposed to using the first DC to DC converter 104, until the vehicle user arranges for repair/replacement of the faulty second DC to DC convertor 106. The vehicle 102 may implement this method when the vehicle 102 may be located in proximity to a charging point. When the vehicle 102 may not be located in proximity to a charging point, the vehicle 102 may implement one or more other methods described above.

Further vehicle details are described below in conjunction with FIG. 2.

The vehicle 102 implements and/or performs operations, as described here in the present disclosure, in accordance with the owner manual and safety guidelines. In addition, any action taken by the vehicle user based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
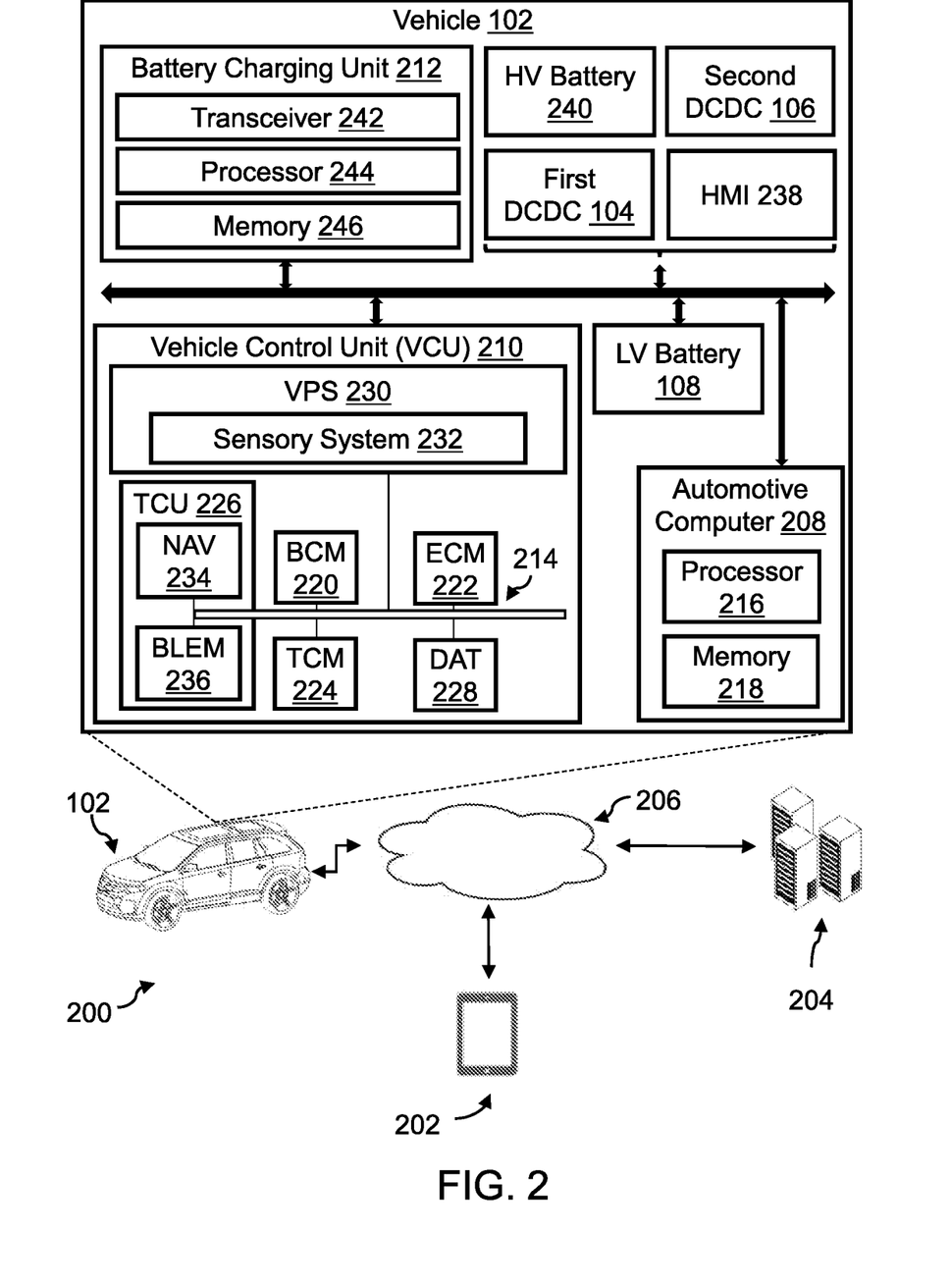
FIG. 2 depicts a block diagram of a system for controlling charging operation of a vehicle battery in accordance with the present disclosure.

FIG. 2 depicts a block diagram of a system 200 for controlling charging operation of the LV battery 108 in accordance with the present disclosure. While describing FIG. 2, references will be made to FIG. 3.

The system 200 may include the vehicle 102, a user device 202, and one or more servers 204 (or server 204) communicatively coupled with each other via one or more networks 206 (or a network 206). The user device 202 may be same as the user device 110 and may be associated with the vehicle user. The user device 202 may be, for example, a mobile phone, a laptop, a computer, a tablet, a wearable device, or any other similar device with communication capabilities.

The server 204 may be part of a cloud-based computing infrastructure and may be associated with and/or include a Telematics Service Delivery Network (SDN) that provides digital data services to the vehicle 102 and other vehicles (not shown) that may be part of a vehicle fleet. In further aspects, the server 204 may be associated with a firm that provides maintenance and repair services to the vehicle 102. In additional aspects, the server 204 may be configured to store and provide to the vehicle 102 locations of a plurality of charging points or chargers in a geographical area where the vehicle 102 may be located. The charging points/chargers may be used to charge the LV battery 108, when required.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a battery charging unit 212 (or unit 212). The VCU 210 may include a plurality of Electronic Control Units (ECUs) 214 disposed in communication with the automotive computer 208.

In some aspects, the user device 202 may be configured to connect with the automotive computer 208 and/or the unit 212 via the network 206, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable storage medium or memory storing a battery charging management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), and other vehicles (not shown in FIG. 2) operating as part of a vehicle fleet. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle accelerometer, a vehicle gyroscope, a vehicle magnetometer, etc.

In some aspects, the VCU 210 may control vehicle operational aspects and implement one or more instruction sets received from the server 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE® Module (BLEM) 236, a Wi-Fi transceiver, an ultra-wideband (UWB) transceiver, and/or other wireless transceivers (not shown in FIG. 2) that may be configurable for wireless communication (including cellular communication) between the vehicle 102 and other systems (e.g., a vehicle key fob, not shown in FIG. 2, the server 204, the user device 202, etc.), computers, and modules. The TCU 226 may be disposed in communication with the ECUs 214 by way of a bus.

The ECUs 214 may control aspects of vehicle operation and communication using inputs from human drivers, inputs from the automotive computer 208, the unit 212, and/or via wireless signal inputs/command signals received via the wireless connection(s) from other connected devices, such as the server 204, the user device 202, among others.

The BCM 220 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system or a vehicle Human-Machine Interface (HMI) 238. The HMI 238 may include a touchscreen interface portion and may include voice recognition features, biometric identification capabilities that may identify users based on facial recognition, voice recognition, fingerprint identification, or other biological identification means. In other aspects, the HMI 238 may be further configured to receive user instructions via the touchscreen interface portion and/or output or display notifications, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

The vehicle 102 may further include an HV battery 240, in addition to the LV battery 108, the first DC to DC converter 104 and the second DC to DC converter 106, as described above in conjunction with FIG. 1. In some aspects, the first DC to DC converter 104 may obtain HV electric power from the HV battery 240 and convert it to LV electric power. When the first DC to DC converter 104 may be charging the LV battery 108 during vehicle key-off (e.g., when the second DC to DC converter 106 may be faulty, as described above in conjunction with FIG. 1), the LV battery 108 may get charged via the LV electric power provided by the first DC to DC converter 104.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 242, a processor 244, and a computer-readable memory 246.

The transceiver 242 may be configured to receive information/inputs from one or more external devices or systems, e.g., the user device 202, the server 204, and/or the like, via the network 206. Further, the transceiver 242 may transmit notifications, requests, signals, etc. to the external devices or systems. In addition, the transceiver 242 may be configured to receive information/inputs from vehicle components such as the vehicle sensory system 232, one or more ECUs 214, the first and second DC to DC converters 104, 106, and/or the like. Further, the transceiver 242 may transmit signals (e.g., command signals) or notifications to the vehicle components such as the BCM 220, the HMI 238, the first and second DC to DC converters 104, 106, and/or the like.

The processor 244 and the memory 246 may be same as or similar to the processor 216 and the memory 218, respectively. In some aspects, the processor 244 may utilize the memory 246 to store programs in code and/or to store data for performing aspects in accordance with the disclosure. The memory 246 may be a non-transitory computer-readable storage medium or memory storing the battery charging management program code. In some aspects, the memory 246 may additionally store one or more inputs associated with the vehicle user. In an exemplary aspect, the inputs associated with the vehicle user may include an estimated time of vehicle key-on or an estimated time of user return to the vehicle 102 (e.g., when the vehicle user may be away from the vehicle 102). In some aspects, the memory 246 may obtain the inputs associated with the vehicle user from a user calendar connected with the vehicle 102, or directly from the vehicle user via the HMI 238 and/or the user device 202. In further aspects, the memory 246 store information associated with historical pattern of vehicle usage, and the processor 244 may determine the estimated time of vehicle key-on or the estimated time of user return to the vehicle 102 based on the information associated with historical pattern of vehicle usage.

In operation, the processor 244 may determine, via the inputs obtained from one or more ECUs 214, that a trigger event may have occurred. In some aspects, the processor 244 may determine that the trigger event may have occurred when the second DC to DC converter 106 becomes faulty or non-operational during vehicle key-off (or the fault in the second DC to DC converter 106 gets carried from vehicle key-on to key-off). Responsive to determining that the trigger event may have occurred during vehicle key-off, the processor 244 may estimate a future vehicle usage based on the inputs associated with the vehicle user and/or the information associated with historical pattern of vehicle usage (that may be stored in the memory 246, as described above). Specifically, responsive to determining that the trigger event may have occurred during vehicle key-off, the processor 244 may estimate a time when the vehicle user may return to the vehicle 102 (and switch ON the vehicle engine) based on the inputs associated with the vehicle user and/or the information associated with historical pattern of vehicle usage. In some aspects, the processor 244 may control the charging operation of the LV battery 108 by the first DC to DC converter 104 based on the estimated future vehicle usage or the estimated time when the vehicle user may return to the vehicle 102.

The processor 244 may implement one or more different methods/approaches to charge the LV battery 108 during vehicle key-off when the second DC to DC converter 106 becomes faulty or non-operational, as described below. The methods/approaches described below should not be construed as limiting, and the processor 244 may implement one or more different approaches or a combination of the approaches described below to efficiently charge the LV battery 108 during vehicle key-off.

In some aspects, responsive to determining that the trigger event may have occurred, the processor 244 may cause the vehicle 102 to enter a battery-saving mode or critical-energy mode and may shut down/switch OFF all non-essential (or non-critical) key-off loads to conserve energy in the LV battery 108, as described above in conjunction with FIG. 1. The processor 244 may further transmit, via the transceiver 242, a first alert notification to the user device 202, informing the vehicle user about the faulty second DC to DC converter 106. In some aspects, the vehicle user may arrange for repair or replacement of the faulty second DC to DC converter 106 when the vehicle user receives the first alert notification on the user device 202. In additional aspects, the processor 244 may output a second alert notification (e.g., an LV battery error notification) on the HMI 238, responsive to determining that the trigger event may have occurred.

In further aspects, the processor 244 may obtain one or more real-time inputs or parameters associated with the vehicle 102 and/or one or more vehicle components and determine an optimal approach to charge the LV battery 108 to optimize the LV battery health, the first DC to DC converter health and/or run time. For example, the processor 244 may obtain information associated with low-voltage battery health status from the LV battery 108 (or one or more ECUs 214), information associated with first DC to DC converter health status and run time from the first DC to DC converter 104 (or one or more ECUs 214), information associated with ambient temperature from the ambient temperature sensor included in the vehicle sensory system 232, a real-time vehicle geolocation from the NAV receiver 234, and/or the like. Responsive to obtaining the inputs/information/parameters described above and estimating a time when the vehicle user may return to the vehicle 102, the processor 244 may determine an optimal strategy/approach to charge the LV battery 108 by using the first DC to DC converter 104, as described below.

In some aspects, when the processor 244 determines that the vehicle user may be expected to return to the vehicle 102 or use the vehicle 102 within a predefined time duration (e.g., within one to two days, as determined via the estimated future vehicle usage), the processor 244 may determine a low-voltage battery health based on the information associated with low-voltage battery health status. The processor 244 may cause the first DC to DC converter 104 to charge the LV battery 108 continuously or at a frequency greater than a predefined frequency threshold when the processor 244 determines that the low-voltage battery health may be poor or less than a predefined health threshold. A person ordinarily skilled in the art may appreciate that when the first DC to DC converter 104 charges the LV battery 108 continuously (or at a higher frequency), a level or "depth" of discharge of the LV battery 108 may be low, and hence there may be less wear and tear of the LV battery 108. In this manner, the processor 244 prevents the LV battery health from further deteriorating, when the processor 244 determines that the LV battery health may already be poor.

On the other hand, when the processor 244 determines that the vehicle user may be expected to return to the vehicle 102 or use the vehicle 102 within the predefined time duration (based on the future vehicle usage) and the low-voltage battery health may be good or greater than the predefined health threshold, the processor 244 may determine a first DC to DC converter health based on the information associated with first DC to DC converter health status and a first DC to DC converter run time based on the information associated with first DC to DC converter run time. The processor 244 may cause the first DC to DC converter 104 to "cyclically" charge the LV battery 108 (as opposed to charging it continuously) when the processor 244 determines that the first DC to DC converter health may be poor or less than a predefined converter health threshold and/or the first DC to DC converter run time may be greater than a predefined run time threshold. Specifically, in this case, the processor 244 may cause the first DC to DC converter 104 to charge the LV battery 108 when the LV battery SOC level drops by the predefined discharge SOC level below the standard SOC level, responsive to determining that the first DC to DC converter health may be less than the predefined converter health threshold and/or the first DC to DC converter run time may be greater than the predefined run time threshold, as described above in conjunction with FIG. 1. The processor 244 may further cause the first DC to DC converter to stop charging the LV battery 108 when the LV battery SOC level reaches to the standard SOC level. The processor 244 may again cause the first DC to DC converter to charge the LV battery 108 when the LV battery SOC level drops below a difference between the standard SOC level and the predefined discharge SOC level. In this manner, the processor 244 may cause the first DC to DC converter 104 to "cyclically" charge the LV battery 108.

A person ordinarily skilled in the art may appreciate that by cyclically charging the LV battery 108 by using the first DC to DC converter 104 (as opposed to charging continuously), the processor 244 may ensure lower run time for the first DC to DC converter 104 and/or lower wear and tear of the first DC to DC converter 104.

In some aspects, the processor 244 may determine an optimal predefined discharge SOC level (or an optimal "depth of discharge") for the LV battery 108 based on the information associated with LV battery health status and the information associated with first DC to DC converter health status. The processor 244 may additionally determine the optimal predefined discharge SOC level based on the ambient temperature and the estimate time of user return to the vehicle 102. The processor 244 may determine the predefined discharge SOC level such that an LV battery charging time or battery cycling and the first DC to DC converter run time may be optimized. A person ordinarily skilled in the art may appreciate that a larger discharge SOC level may result in higher wear and tear for the LV battery 108 and a lower run time for the first DC to DC converter 104. On the other hand, a smaller discharge SOC level may result in greater run time for the first DC to DC converter 104 and potentially less wear and tear for the LV battery 108.

In additional aspects, when the processor 244 determines that the vehicle user may be expected to return to the vehicle 102 or use the vehicle 102 within the predefined time duration based on the future vehicle usage, the processor 244 may determine the ambient temperature in a geographical area where the vehicle 102 may be located (based on the information associated with ambient temperature) and the first DC to DC converter run time based on the information associated with first DC to DC converter run time. The processor 244 may cause the first DC to DC converter 104 to charge the LV battery 108 continuously when the processor 244 determines that the ambient temperature may be less than a predefined temperature threshold (i.e., the ambient temperature may be cold) and the first DC to DC converter run time may be less than the predefined run time threshold (i.e., when the first DC to DC converter 104 may have a plenty of remaining run time/life). A person ordinarily skilled in the art may appreciate that when the ambient temperature may be cold, the coolant pumps/fans may not be required to be operated when the first DC to DC converter 104 charges the LV battery 108 during vehicle key-off, and hence vehicle energy consumption may be optimized.

In some aspects, when the processor 244 determines that the vehicle user may not be expected to return to the vehicle 102 or use the vehicle 102 within the predefined time duration (i.e., may not return to the vehicle 102 for, e.g., multiple weeks) based on the future vehicle usage, the processor 244 may transmit, via the transceiver 242, a predefined message to the user device 202. The predefined message may indicate to the vehicle user that since the vehicle user may not return to the vehicle 102 within the predefined time duration (e.g., may not return for multiple weeks), it may be advisable to cause the LV battery 108 to enter a dead-battery mode and perform dead battery restart when the vehicle user returns to the vehicle 102, as opposed to charging/discharging the LV battery 108 and operating the first DC to DC converter 104 for multiple weeks (which may put stress on the LV battery 108 and/or the first DC to DC converter 104), as described above in conjunction with FIG. 1. The predefined message may further provide an option to the vehicle user to cause the LV battery 108 to enter a dead-battery mode, as shown in a view 302 of FIG. 3. In some aspects, the predefined message may additionally inform the vehicle user about an estimated count of days the vehicle 102/LV battery 108 may stay alive or energized, an estimated LV battery life already lost, and/or the like.

Figure 3:
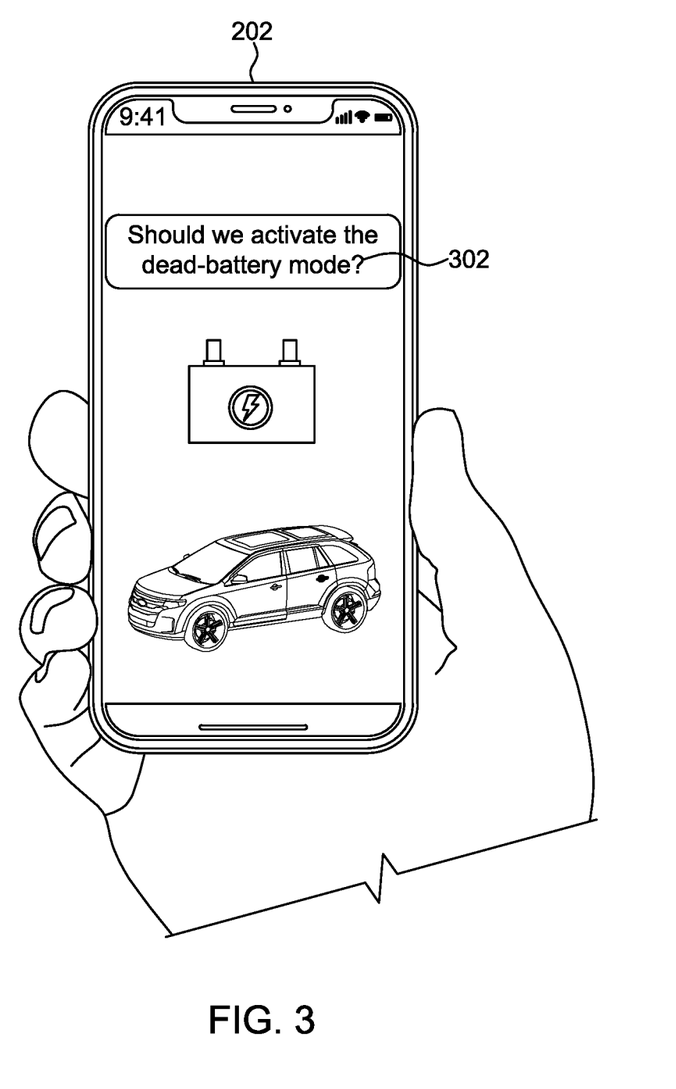
FIG. 3 depicts a snapshot of a message being displayed on a user device in accordance with the present disclosure.

The vehicle user may view the predefined message/option on the user device 202 and accept the option to cause the LV battery 108 to enter the dead-battery mode on the user device 202. The processor 244 may obtain, via the transceiver 242, a confirmation from the user device 202 when the vehicle user accepts the option on the user device 202. Responsive to obtaining the confirmation, the processor 244 may cause the first DC to DC converter 104 to charge the LV battery 108 to its maximum battery SOC level and then disable the first DC to DC converter 104 from further charging the LV battery 108. The processor 244 may further shut down the vehicle 102 or the vehicle power consumption.

In this case, the vehicle user may jump start the vehicle 102 via an LV battery port when the vehicle user returns to the vehicle 102 (unless the vehicle user returns before the LV battery 108 completely expends its stored energy). Since the vehicle 102 may be completely shut down in this method, the LV battery 108 may stay alive for a longer time duration. The advantage of this method is that only a couple of amperes may be needed to recharge the LV battery 108, as opposed to higher amperes when a battery gets completely drained out in a full dead battery access situation. This method minimizes wear and tear of the LV battery 108 and/or the first DC to DC converter 104 and prevents other vehicle components from becoming faulty while also maintaining the HV battery SOC in the user's extended absence.

In further aspects, the processor 244 may be configured to determine that the vehicle 102 may be located in proximity to a charging point based on the real-time vehicle geolocation and information associated with the locations of a plurality of charging points or chargers in a geographical area where the vehicle 102 may be located that the processor 244 may obtain from the server 204. Responsive to determining that the vehicle 102 may be located in proximity to a charging point (e.g., at user's home), the processor 244 may transmit, via the transceiver 242, a request to the user device 202 requesting the vehicle user to charge the LV battery 108 using the charging point. In this case, the processor 244 may not use the first DC to DC converter 104 to charge the LV battery 108 and may instead charge the LV battery 108 using the charging point until the vehicle user arranges for the replacement or repair of the faulty second DC to DC converter 106.

In some aspects, when the expected time to repair the faulty second DC to DC converter 106 may be less (e.g., less than a predefined threshold), the processor 244 may continue to run some essential vehicle key-off loads. In further aspects, the processor 244 may transmit, via the transceiver 242 and the network 206 or vehicle-to-vehicle (V2V) and/or vehicle-to-infrastructure (V2I) communication, a maintenance notification to the server 204 or a user device associated with a vehicle maintenance firm, when the processor 244 determines that the second DC to DC converter 106 may be faulty. In this case, the vehicle maintenance firm may repair the second DC to DC converter 106 before the vehicle user returns to the vehicle 102 and/or arrange a portable jumping service/piece of hardware.

Figure 4:
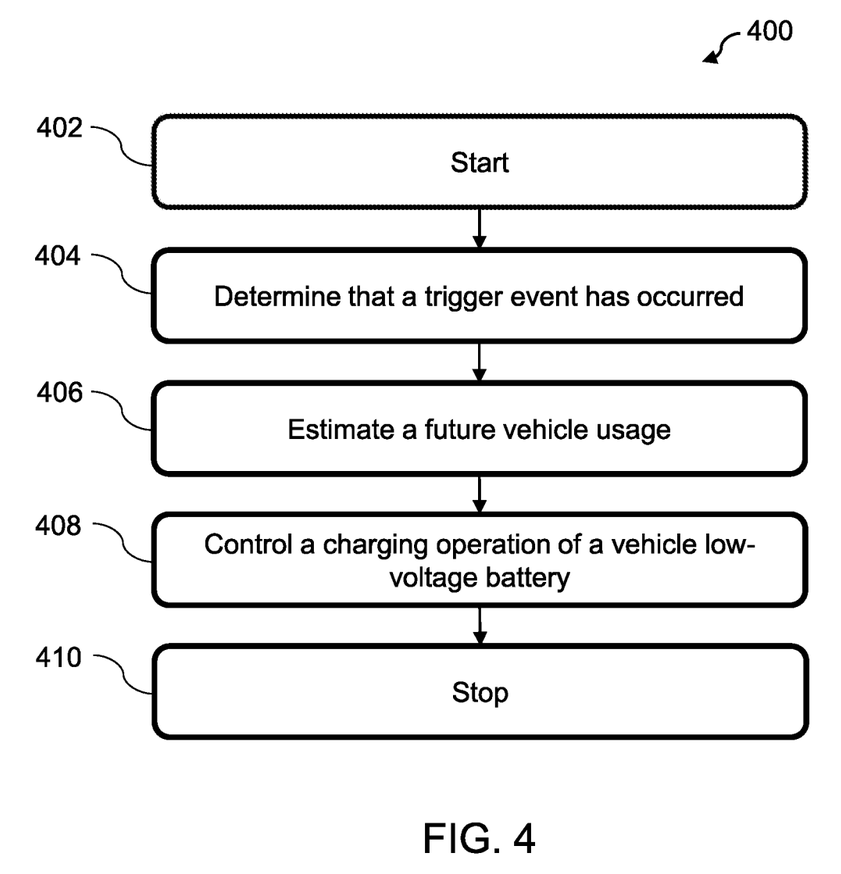
FIG. 4 depicts a flow diagram of a method for controlling charging operation of a vehicle battery in accordance with the present disclosure.

FIG. 4 depicts a flow diagram of a method 400 for controlling charging operation of the LV battery 108 in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include determining, by the processor 244, that the trigger event may have occurred. At step 406, the method 400 may include estimating, by the processor 244, the future vehicle usage based on the inputs associated with the vehicle user. At step 408, the method 400 may include controlling, by the processor 244, the charging operation of the LV battery 108 by the first DC to DC converter 104 based on the future vehicle usage, as described above in conjunction with FIGS. 1 and 2.

The method 400 may end at step 410.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a first Direct Current-to-Direct Current (DC to DC) converter configured to convert a high voltage electric power to a low voltage electric power;
   a low-voltage battery configured to be charged by the first DC to DC converter via the low voltage electric power;
   a memory configured to store inputs associated with a vehicle user; and
   a processor communicatively coupled with the first DC to DC converter, the low-voltage battery and the memory, wherein the processor is configured to:
      determine that a trigger event has occurred during vehicle key off;
      estimate a future vehicle usage based on the inputs, including an expected time when the vehicle user returns to the vehicle, responsive to determining that the trigger event has occurred; and
      control a charging operation of the low-voltage battery by the first DC to DC converter based on the future vehicle usage.

2. The vehicle of claim 1 further comprising a second DC to DC converter configured to charge the low-voltage battery during vehicle key off.

3. The vehicle of claim 2, wherein the first DC to DC converter is associated with a first ampere rating and the second DC to DC converter is associated with a second ampere rating, and wherein the first ampere rating is greater than the second ampere rating.

4. The vehicle of claim 2, wherein the processor determines that the trigger event has occurred when the second DC to DC converter is non-operational during vehicle key off.

5. The vehicle of claim 1, wherein the processor is further configured to switch off one or more key off vehicle loads responsive to determining that the trigger event has occurred.

6. The vehicle of claim 1, wherein the processor is further configured to transmit a first alert notification to a user device associated with the vehicle user responsive to determining that the trigger event has occurred.

7. The vehicle of claim 1, wherein the processor is further configured to output a second alert notification to a vehicle Human-Machine Interface (HMI) responsive to determining that the trigger event has occurred.

8. The vehicle of claim 1, wherein the inputs associated with the vehicle user comprises an estimated time of vehicle key-on or an estimated time of user return to the vehicle.

9. The vehicle of claim 1 further comprising a high-voltage battery, wherein the first DC to DC converter obtains the high voltage electric power from the high-voltage battery.

10. The vehicle of claim 1, wherein the processor is further configured to obtain at least one of: information associated with low-voltage battery health status, information associated with first DC to DC converter health status, information associated with first DC to DC converter run time, information associated with ambient temperature, and a vehicle geolocation.

11. The vehicle of claim 10, wherein the processor is further configured to:
   determine that the vehicle user is expected to use the vehicle within a predefined time duration based on the future vehicle usage;
   determine that a low-voltage battery health is less than a predefined health threshold based on the information associated with low-voltage battery health status, responsive to determining that the vehicle user is expected to use the vehicle within the predefined time duration; and
   cause the first DC to DC converter to charge the low-voltage battery continuously or at a frequency greater than a predefined frequency threshold, responsive to determining that the low-voltage battery health is below the predefined health threshold.

12. The vehicle of claim 10, wherein the processor is further configured to:
   determine that the vehicle user is expected to use the vehicle within a predefined time duration based on the future vehicle usage;
   determine that a low-voltage battery health is greater than a predefined health threshold based on the information associated with low-voltage battery health status, responsive to determining that the vehicle user is expected to use the vehicle within the predefined time duration;
   determine that a first DC to DC converter health is less than a predefined converter health threshold or a first DC to DC converter run time is greater than a predefined run time threshold based on the information associated with first DC to DC converter health status and the information associated with first DC to DC converter run time, responsive to determining that the low-voltage battery health is greater than the predefined health threshold; and cause the first DC to DC converter to charge the low-voltage battery when a low-voltage battery state of charge (SOC) level drops by a predefined discharge SOC level below a standard SOC level, responsive to determining that the first DC to DC converter health is less than the predefined converter health threshold or the first DC to DC converter run time is greater than the predefined run time threshold.

13. The vehicle of claim 12, wherein the processor is further configured to cause the first DC to DC converter to stop charging the low-voltage battery when the low-voltage battery SOC level reaches to the standard SOC level.

14. The vehicle of claim 12, wherein the processor is further configured to determine the predefined discharge SOC level based on the information associated with low-voltage battery health status and the information associated with first DC to DC converter health status.

15. The vehicle of claim 10, wherein the processor is further configured to:
   determine that the vehicle user is expected to use the vehicle within a predefined time duration based on the future vehicle usage;
   determine that an ambient temperature is less than a predefined temperature threshold based on the information associated with ambient temperature, responsive to determining that the vehicle user is expected to use the vehicle within the predefined time duration;
   determine that a first DC to DC converter run time is less than a predefined run time threshold based on the information associated with first DC to DC converter run time, responsive to determining that the ambient temperature is less than the predefined temperature threshold; and
   cause the first DC to DC converter to charge the low-voltage battery continuously, responsive to determining that the first DC to DC converter run time is less than the predefined run time threshold.

16. The vehicle of claim 10, wherein the processor is further configured to:
   determine that the vehicle user is not expected to use the vehicle within a predefined time duration based on the future vehicle usage;
   transmit a predefined message to a user device associated with the vehicle user, responsive to determining that the vehicle user is not expected to use the vehicle within the predefined time duration;
   obtain a confirmation from the user device responsive to transmitting the predefined message;
   cause the first DC to DC converter to charge the low-voltage battery to a maximum battery SOC level, responsive to obtaining the confirmation;
   disable the first DC to DC converter from further charging the low-voltage battery; and
   shut down power consumption in the vehicle.

17. The vehicle of claim 10, wherein the processor is further configured to:
   determine that the vehicle is located in proximity to a charging point based on the vehicle geolocation; and
   transmit a request to a user device associated with the vehicle user to charge the low-voltage battery using the charging point, responsive to determining that the vehicle is located in proximity to the charging point.

18. The vehicle of claim 1, wherein the processor is further configured to transmit a maintenance notification to a server or a user device associated with a vehicle maintenance firm, responsive to determining that the trigger event has occurred.

19. A method to control a charging operation of a low-voltage battery of a vehicle, the method comprising:
   determining, by a processor, that a trigger event has occurred during vehicle key off;
   estimating, by the processor, a future vehicle usage based on inputs including an expected time when the vehicle user returns to the vehicle associated with the vehicle user responsive to determining that the trigger event has occurred; and
   controlling, by the processor, the charging operation of the low-voltage battery by a DC to DC converter of the vehicle based on the future vehicle usage, wherein the DC to DC converter is configured to convert a high voltage electric power to a low voltage electric power, and wherein the low-voltage battery is configured to be charged by the DC to DC converter via the low voltage electric power.

20. A non-transitory computer-readable storage medium having instructions stored thereupon which, when executed by a processor, cause the processor to:
   determine that a trigger event has occurred during vehicle key off;
   estimate a future vehicle usage of a vehicle based on inputs including an expected time when a vehicle user returns to the vehicle associated with the vehicle user responsive to determining that the trigger event has occurred; and
   control a charging operation of a low-voltage battery of the vehicle by a DC to DC converter of the vehicle based on the future vehicle usage, wherein the DC to DC converter is configured to convert a high voltage electric power to a low voltage electric power, and wherein the low-voltage battery is configured to be charged by the DC to DC converter via the low voltage electric power.

* * * * *